US008107948B2

(12) United States Patent
Nishigai

(10) Patent No.: US 8,107,948 B2
(45) Date of Patent: Jan. 31, 2012

(54) RADIO COMMUNICATION SYSTEM, MANAGEMENT SERVER, RADIO COMMUNICATION TERMINAL, AND RADIO COMMUNICATION METHOD

(75) Inventor: Takanobu Nishigai, Yokohama (JP)

(73) Assignee: Kyocera Corporation, Kyoto (JP)

( * ) Notice: Subject to any disclaimer, the term of this patent is extended or adjusted under 35 U.S.C. 154(b) by 177 days.

(21) Appl. No.: 12/602,490

(22) PCT Filed: May 29, 2008

(86) PCT No.: PCT/JP2008/059946
§ 371 (c)(1),
(2), (4) Date: Feb. 3, 2010

(87) PCT Pub. No.: WO2008/149780
PCT Pub. Date: Dec. 11, 2008

(65) Prior Publication Data
US 2010/0190484 A1 Jul. 29, 2010

(30) Foreign Application Priority Data
May 30, 2007 (JP) .................................. 2007-144284

(51) Int. Cl.
*H04W 4/00* (2009.01)
*H04B 7/00* (2006.01)
(52) U.S. Cl. ...................... 455/422.1; 455/518; 455/519
(58) Field of Classification Search ........................ None
See application file for complete search history.

(56) References Cited

U.S. PATENT DOCUMENTS
2007/0127670 A1  6/2007 Morishima et al.
2010/0016007 A1* 1/2010 Satake .......................... 455/518

FOREIGN PATENT DOCUMENTS
JP  08-307544   11/1996
JP  2001-168793  6/2001
WO  WO-2006/003709  1/2006

OTHER PUBLICATIONS
International Search Report for PCT/JP2008/059946, mailed on Aug. 26, 2008, 1 page.
International Preliminary Report on Patentability for PCT/JP2008/059946, issued Jan. 12, 2010, 4 pages.

* cited by examiner

*Primary Examiner* — Erika Gary
(74) *Attorney, Agent, or Firm* — Morrison & Foerster LLP

(57) ABSTRACT

A SIP server 200 according to a present invention includes: a judgment unit 205 configured to specify an application executed by a mobile station transmitting INVITE (halfway participation) on the basis of INVITE (halfway participation) received from the mobile station, and to judge whether an application which is being executed in the group call (active application) matches the application executed by the mobile station transmitting INVITE (halfway participation); and a SIP information transmitter 206 configured to notify the mobile station transmitting INVITE (halfway participation) of the active application when judged that the active application is different from the application executed by the mobile station transmitting INVITE (halfway participation).

7 Claims, 10 Drawing Sheets

FIG. 3

RECEIVED CALL RECORDS

| ORIGINATING MOBILE STATION | INITIALLY DESIGNATED MOBILE STATION LIST | GROUP ID | INITIAL APPLICATION |
|---|---|---|---|
| MOBILE STATION 10a | MOBILE STATION 10a, MOBILE STATION 10b, MOBILE STATION 10c, MOBILE STATION 10d | No. 001 | PTT |
| MOBILE STATION 10x | MOBILE STATION 10x, MOBILE STATION 10y, MOBILE STATION 10z, MOBILE STATION 10d | No. 002 | PTT |
| MOBILE STATION 10b | MOBILE STATION 10a, MOBILE STATION 10b, MOBILE STATION 10c, MOBILE STATION 10d | No. 003 | IP-TV |
| ... | ... | ... | ... |

FIG. 5

(a) GROUP CALL MANAGEMENT INFORMATION

| GROUP ID | ORIGINATING MOBILE STATION | INITIALLY DESIGNATED MOBILE STATION LIST | CURRENTLY PARTICIPATING MEMBERS | ACTIVE APPLICATION | CALL STATUS |
|---|---|---|---|---|---|
| No. 001 | MOBILE STATION 10a | MOBILE STATION 10a, MOBILE STATION 10b, MOBILE STATION 10c, MOBILE STATION 10d | MOBILE STATION 10a, MOBILE STATION 10b, MOBILE STATION 10c | PTT | CALLING |
| No. 002 | MOBILE STATION 10x | MOBILE STATION 10x, MOBILE STATION 10y, MOBILE STATION 10z, MOBILE STATION 10d | — | — | TERMINATED |
| ... | | | | | |

(b)

| GROUP ID | ORIGINATING MOBILE STATION | INITIALLY DESIGNATED MOBILE STATION LIST | CURRENTLY PARTICIPATING MEMBERS | ACTIVE APPLICATION | CALL STATUS |
|---|---|---|---|---|---|
| No. 001 | MOBILE STATION 10a | MOBILE STATION 10a, MOBILE STATION 10b, MOBILE STATION 10c, MOBILE STATION 10d | MOBILE STATION 10a, MOBILE STATION 10e, MOBILE STATION 10f | PTT | CALLING |
| No. 002 | MOBILE STATION 10x | MOBILE STATION 10x, MOBILE STATION 10y, MOBILE STATION 10z, MOBILE STATION 10d | — | — | TERMINATED |
| No. 003 | MOBILE STATION 10b | MOBILE STATION 10a, MOBILE STATION 10b, MOBILE STATION 10c, MOBILE STATION 10d | MOBILE STATION 10b, MOBILE STATION 10c | IP-TV | CALLING |
| ... | | | | | |

RADIO COMMUNICATION SYSTEM, MANAGEMENT SERVER, RADIO COMMUNICATION TERMINAL, AND RADIO COMMUNICATION METHOD

CROSS-REFERENCE TO RELATED APPLICATIONS

This is a US National Phase Application of International Application No. PCT/JP2008/059946 filed May 29, 2008, which claims priority to Japanese Patent Application No. 2007-144284 filed May 30, 2007, the disclosures of which are incorporated herein by reference in their entirety.

TECHNICAL FIELD

The present invention relates to a radio communication system including a management server and radio communication terminals each configured to communicate with the management server, the management server configured to manage a group call in which a call within a group consisting of multiple radio communication terminals is possible, and relates to a management server, a radio communication terminal, and a radio communication method which are used in the radio communication system.

BACKGROUND ART

Recently, IP-related protocol groups such as not only IP (Internet Protocol) but also SIP (Session Initiation Protocol; RFC3261) to execute call control among radio communication terminals have been used also in a radio communication system such as a mobile communication system.

In a radio communication system using the protocol groups, a group call is provided in which a call within a group consisting of multiple radio communication terminals is established when one of the radio communication terminals (for example, a cellular telephone terminal) calls up the other radio communication terminals. Each of the radio communication terminals participating in the group call can transmit and receive voice data and video data to and from the other radio communication terminals participating in the group call.

Meanwhile, there is proposed a radio communication system which allows a radio communication terminal to participate halfway in a group call (hereinafter such participation being referred to as halfway participation) (see Patent Document 1). Specifically, in this radio communication system, a control station device periodically broadcasts notification information including information on the group call to radio communication terminals through a radio base station.

In this way, a radio communication terminal which has failed to receive a call-up signal can receive the notification information, and participate halfway in the group call by transmitting a request for participation in the group call. Patent Document 1: JP-A 2001-168793 (pages 5 to 7, FIGS. 1 and 3)

DISCLOSURE OF THE INVENTION

Applications to execute a group call include PTT (Push-To-Talk), IP-television phone (hereinafter referred to as IP-TV (Internet Protocol-TV (Television)) phone or Internet Protocol-Video Phone)), and the like. The PTT is an application to allocate an authority to transmit voice data, namely, an authority for a user to speak (a right to speak) to only one of radio communication terminals participating in a group call. The IP-TV is an application which enables transmission and reception of not only voice data but also video data.

To participate in a group call, radio communication terminals need to use an application which is being executed in the group call. Meanwhile, the application may be changed during the group call. In the method of the above-described Patent Document 1, a conceivable way to allow a radio communication terminal, which has failed to receive the call-up signal, to operate properly according to the change in the application during the group call is that the control station device periodically notifies the radio communication terminal of the application which is being executed in the group call by using the notification information.

However, there is a problem that the radio communication terminal which has failed to receive the call-up signal cannot participate halfway in the group call if the application which is being executed in the group call is changed in a period from reception of the notification information to transmission of a participation request.

Here, the radio communication terminal can acquire the latest information on the group call by shortening a notification cycle of the notification information. However, consumption of network resources by the notification information is increased as a result of an increased frequency of communication line occupancy by the notification information.

The present invention has been made in order to solve the above-mentioned problem, and an object thereof is to provide a radio communication system which allows a radio communication terminal to participate in a group call by use of an application which is being executed in the group call even when the radio communication participates halfway in the group call, and to provide a management server, a radio communication terminal, and a radio communication method to be used in the radio communication system.

A first characteristic of the present invention is summarized that a radio communication system (mobile communication system 1) includes: a management server (SIP server 200) configured to manage a group call in which a call within a group (group G) consisting of a plurality of radio communication terminals (mobile stations 10) is possible; and a radio communication terminal (mobile station 10) configured to communicate with the management server. The management server includes: a halfway participation request receiver (SIP information receiver 201) configured to receive a halfway participation request (INVITE (halfway participation)) for requesting halfway participation in the group call from the radio communication terminal; a judgment unit (judgment unit 205) configured to specify an application executed by the radio communication terminal transmitting the halfway participation request on the basis of the halfway participation request received by the halfway participation request receiver, and to judge whether the specified application matches an active application that is an application which is being executed in the group call; and an application notifying unit (SIP information transmitter 206) configured to notify the radio communication terminal transmitting the halfway participation request of the active application when a judgment is made that the application executed by the radio communication terminal transmitting the halfway participation request is different from the active application. The radio communication terminal includes: a transmitter configured to transmit the halfway participation request to the management server; a receiver configured to receive a notification of the active application (answer failure (BYE)) from the management server; and a controller configured to perform control, based on the notification received by the receiver, so that the halfway participation request (INVITE (halfway participation)) is retransmitted to the management server by using the active application.

According to the radio communication system described above, the management server specifies the application to be executed by the radio communication terminal on the basis of the halfway participation request received from the radio communication terminal, and notifies the radio communication terminal of the active application if the specified application is different from the active application. The radio communication terminal receives the notification of the active application from the management server, and retransmits the halfway participation request to the management server by using the active application on the basis of the notification.

Accordingly, the radio communication terminal can participate in the group call by using the active application even when the radio communication terminal is participating halfway in the group call.

A second characteristic of the present invention is summarized as a management server configured to manage a group call in which a call within a group consisting of a plurality of radio communication terminals is possible. The management server includes: a halfway participation request receiver configured to receive a halfway participation request for requesting halfway participation in the group call from a radio communication terminal; a judgment unit configured to specify an application executed by the radio communication terminal transmitting the halfway participation request on the basis of the halfway participation request received by the halfway participation request receiver, and to judge whether the specified application matches an active application that is an application which is being executed in the group call; and an application notifying unit configured to notify the radio communication terminal transmitting the halfway participation request of the active application when the judgment unit judges that the application executed by the radio communication terminal transmitting the halfway participation request is different from the active application.

A third characteristic of the present invention is summarized as a radio communication terminal configured to communicate with a management server managing a group call in which a call within a group consisting of a plurality of radio communication terminals is possible. The radio communication terminal includes: a transmitter configured to transmit a halfway participation request for requesting halfway participation in the group call to the management server; a receiver configured to receive a notification of an active application from the management server, the active application being an application which is being executed in the group call; and a controller configured to perform control (halfway participation processor 25*b*), based on the notification received by the receiver, so that the halfway participation request is retransmitted to the management server by using the active application.

A fourth characteristic of the present invention is according to the third characteristic of the present invention, and is summarized as further comprising: an operation unit (operation unit 18) configured to receive a user input; and a display unit (display unit 15*b*) configured to display information indicating the active application on the basis of the notification received by the receiver. The controller retransmits the halfway participation request to the management server by using the active application when an instruction to retransmit the halfway participation request to the management server is inputted on the basis of a display of the information indicating the active application on the display unit.

A fifth characteristic of the present invention is according to the third characteristic of the present invention, further comprising a connection controller (call processor 24) configured to set up call connection to the management server for each application (for example, session). The connection controller disconnects the call connection to the management server when the receiver receives the notification of the active application, and the controller retransmits the halfway participation request to the management server by using the active application when the connection controller disconnects the call connection to the management server.

A sixth characteristic of the present invention is according to the third characteristic of the present invention, further comprising: a registration request receiver (SMS information acquisition unit 21) configured to receive a registration request for requesting registration to the management server (SMS (registration request)), the registration request including initial application identification information for identifying an initial application being an application executed at a start of the group call; and a storage unit configured to store the initial application identification information included in the registration request. The transmitter transmits the halfway participation request to the management server by using the initial application on the basis of the initial application identification information stored in the storage unit.

A seventh characteristic of the present invention is summarized as a radio communication method using a management server configured to manage a group call in which a call within a group consisting of a plurality of radio communication terminals is possible, and using a radio communication terminal configured to communicate with the management server. The method includes the steps of: transmitting, at the radio communication terminal, a halfway participation request for requesting participation in the group call to the management server (step 212); receiving, at the management server, the halfway participation request from the radio communication terminal (step 212); specifying, at the management server, an application executed by the radio communication terminal on the basis of the halfway participation request received in the receiving step (step 310); judging, at the management server, whether the application executed by the radio communication terminal matches an active application that is an application which is being executed in the group call (step 310); notifying, at the management server, the radio communication terminal of the active application when judging the application executed by the radio communication terminal is different from the active application (step 311); receiving, at the radio communication terminal, a notification of the active application from the management server (step 311); and retransmitting, at the radio communication terminal, the halfway participation request to the management server by using the active application on the basis of the notification received from the management server (step 313).

According to the present invention, it is possible to provide a radio communication system which allows a radio communication terminal to participate in a group call by use of an application which is being executed in the group call even when the radio communication participates halfway in the group call, and to provide a management server, a radio communication terminal, and a radio communication method to be used in the radio communication system.

BRIEF DESCRIPTION OF THE DRAWINGS

FIG. 3 is a view showing received call records stored in the mobile station according to the embodiment of the present invention.

FIG. 5 is a view showing group call management information stored in a SIP server according to the embodiment of the present invention.

BEST MODES FOR CARRYING OUT THE INVENTION

Figure 1:
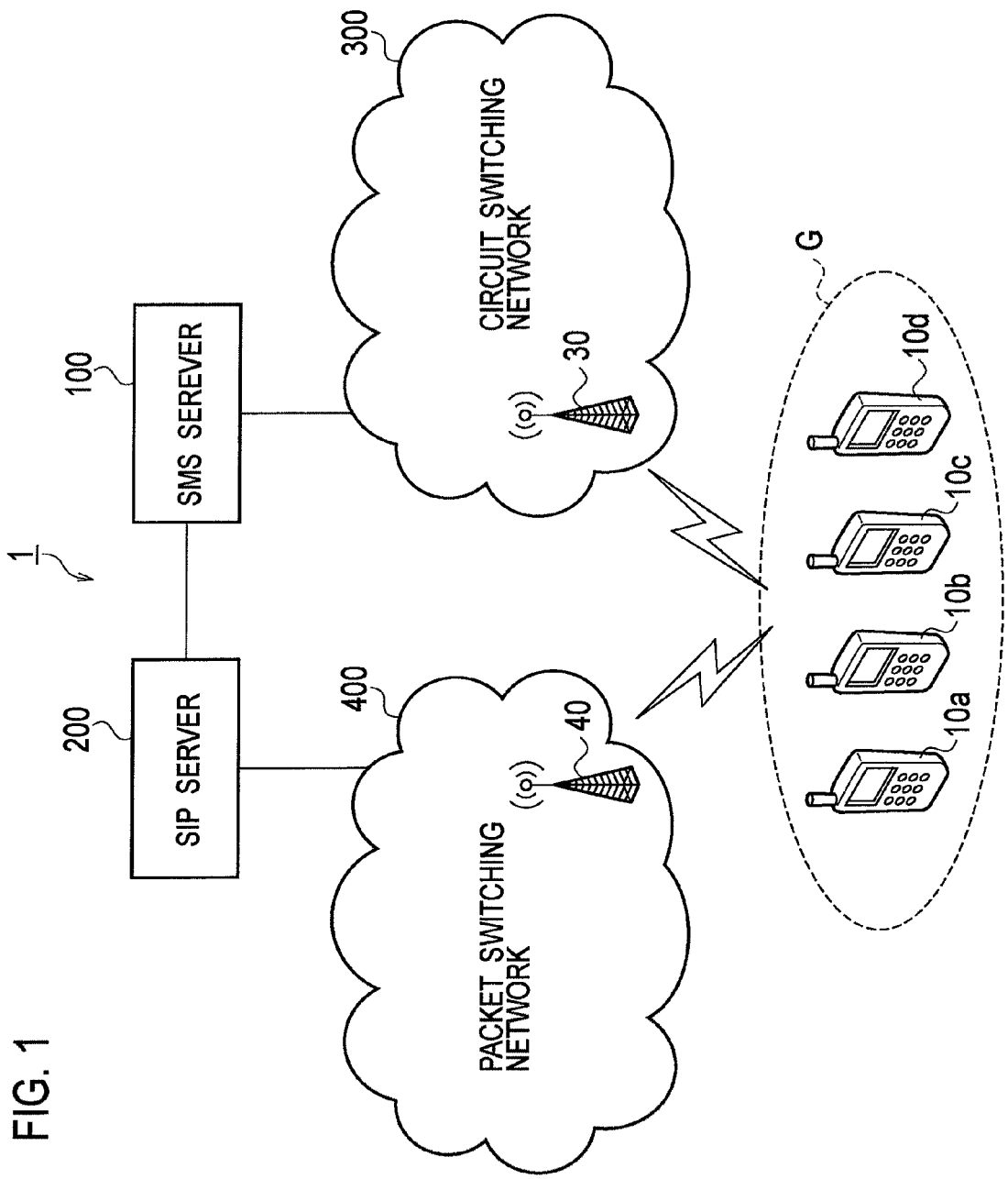
FIG. 1 is an overall schematic configuration diagram of a mobile communication system according to an embodiment of the present invention.

Next, an embodiment of the present invention will be described with reference to the drawings. In the following description of the drawings of the embodiment, identical or similar constituents are designated by identical or similar reference numerals.

The description will be made below in the order of (1) a configuration of a mobile communication system, (2) operations of the mobile communication system, (3) advantageous effects, and (4) other embodiments.

(1) Configuration of Mobile Communication System

Firstly, a configuration of a mobile communication system 1 according to this embodiment will be described with reference to FIGS. 1 to 7. Specifically, (1.1) an overall schematic configuration, (1.2) a configuration of a mobile station, (1.3) a configuration of a SIP server, and (1.4) a configuration of a SMS server will be described.

(1.1) Overall Schematic Configuration

FIG. 1 is an overall schematic configuration diagram of the mobile communication system 1. The mobile communication system 1 includes a SMS (Short Message Service) server 100, a SIP server 200, a circuit switching network 300, a packet switching network 400, and mobile station 10a to 10d. The circuit switching network 300 includes a base station 30, and the packet switching network 400 includes a base station 40. In the following, the mobile station 10a to 10d will be collectively referred to as the mobile station 10.

The SMS server 100 communicates with the mobile station 10 through the circuit switching network 300. The SIP server 200 communicates with the mobile station 10 through the packet switching network 400. Moreover, the SMS server 100 and the SIP server 200 can communicate with each other. The mobile station 10 is connected to the base station 30 and the base station 40 to perform communication.

The circuit switching network 300 is a network configured to perform communication by means of circuit switching (for example, a 1x network used in the cdma 2000). In the circuit switching network 300, an address registration of the mobile station 10 is not required when the mobile station 10 performs communication.

On the other hand, the packet switching network 400 is a network configured to perform communication by means of packet switching (for example, an EV-DO (evolution data optimized) network used in the cdma 2000). In the packet switching network 400, an address registration of the mobile station 10 is required when the mobile station 10 performs communication.

In this embodiment, the mobile station 10 executes a group call through the packet switching network 400. Specifically, the mobile station 10a calls the mobile stations 10b to 10d, and performs the group call with the mobile stations which respond to the call among the mobile stations 10b to 10d.

In the following, the mobile station 10a will be called "an originating mobile station" and the mobile stations 10b to 10d will be called "designated mobile stations" when appropriate. Moreover, in this embodiment, the PTT and the IP-TV are used as the applications for executing the group call.

(1.2) Configuration of Mobile Station

Next, a configuration of the mobile station 10 will be described. Specifically, (1.2.1) a hardware configuration of the mobile station, (1.2.2) a configuration of received call records, and (1.2.3) a functional block configuration of a CPU will be described.

(1.2.1) Hardware Configuration of Mobile Station

Figure 2:
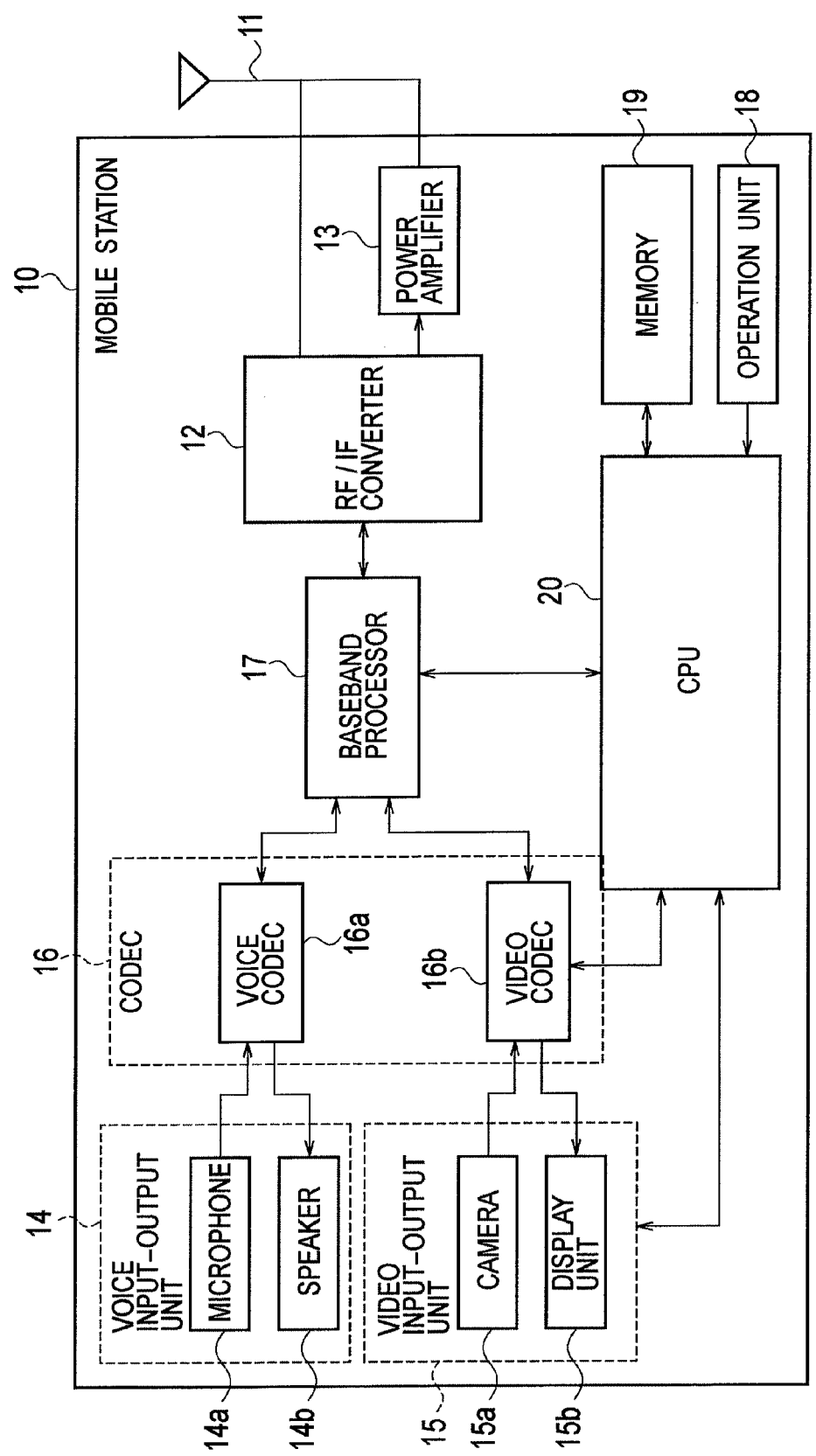
FIG. 2 is a block diagram showing a configuration of a mobile station according to the embodiment of the present invention.

FIG. 2 is a block diagram showing a hardware configuration of the mobile station 10. As shown in FIG. 2, the mobile station 10 includes an antenna 11, a RF/IF (Radio Frequency/Intermediate Frequency) converter 12, a power amplifier 13, a voice input-output unit 14, a video input-output unit 15, a codec 16, a baseband processor 17, an operation unit 18, a memory 19, and a CPU (controller) 20. In this embodiment, the RF/IF converter 12, the power amplifier 13, and the baseband processor 17 constitute a part of a transmitter. Moreover, the RF/IF converter 12 and the baseband processor 17 constitute a part of a receiver.

The antenna 11 transmits signals (transmission signals) to the base station 30 and the base station 40. The RF/IF converter 12 converts a frequency (a RF band) of a reception signal received by the antenna 11 into a frequency (an IF band) handled in the baseband processor 17. Moreover, the RF/IF converter 12 converts a frequency (the IF band) of a transmission signal acquired from the baseband processor 17 into a frequency (the RF band) used in radio communication. Here, the RF/IF converter 12 inputs the transmission signal converted into a radio frequency (the RF band) to the power amplifier 13.

The power amplifier 13 amplifies the transmission signal acquired from the RF/IF converter 12, and inputs the amplified transmission signal to the antenna 11. The voice input-output unit 14 includes a microphone 14a for inputting voices and a speaker 14b for outputting voices. The microphone 14a inputs voice data based on the inputted voices into the codec 16. The speaker 14b outputs the voices based on the voice data acquired from the codec 16.

The video input-output unit 15 includes a camera 15a for shooting a subject and a display unit 15b for displaying characters, video images, and the like. The camera 15a inputs video data based on the shot video images (still images and moving images) into the codec 16. The display unit 15b displays the video images based on the video data acquired from the codec 16. Here, the display unit 15b also displays characters and the like which are inputted by use of the operation unit 18.

The codec 16 includes a voice codec 16a and a video codec 16b. The voice codec 16a encodes and decodes the voice data in accordance with G.729 defined by the ITU-T, for example. The video codec 16b encodes and decodes the video data in accordance with MPEG (Moving Picture coding Experts Group)-4 and the like, for example.

The voice codec 16a encodes a voice signal acquired from the voice input-output unit 14, and decodes a voice signal acquired from the baseband processor 17. The video codec 16b encodes a video signal acquired from the video input-output unit 15, and decodes a video signal acquired from the baseband processor 17.

The baseband processor 17 performs modulation of the transmission signals and demodulation of the reception signals in accordance with modulation schemes such as BPSK (Binary Phase Shift Keying) and QPSK (Quadrature Phase Shift Keying). Specifically, the baseband processor 17 modulates a baseband signal such as the voice signal or the video signal acquired from the codec 16, and inputs the modulated baseband signal (the transmission signal) into the RF/IF converter 12. Moreover, the baseband processor 17 demodulates a reception signal acquired from the RF/IF converter 12, and inputs the demodulated reception signal (the baseband signal) into the codec 16.

The baseband processor 17 modulates information (SMS information and SIP information) generated by the CPU 20, and inputs the modulated information (the transmission signal) into the RF/IF converter 12. Moreover, the baseband processor 17 demodulates the reception signal acquired from the RF/IF converter 12, and inputs the demodulated information (the SMS information and the SIP information) into the CPU 20.

Here, the SMS information is the information to be transmitted and received through the circuit switching network 300. The SIP information is the information to be transmitted and received through the packet switching network 400.

The operation unit 18 is a group of keys including an input key for inputting characters and numbers, an call key for starting a group call, an answer key for answering an incoming call (call), and the like. When each key is pressed, the operation unit 18 inputs an input signal corresponding to the pressed key into the CPU 20. The memory 19 stores programs for controlling operations of the mobile station 10 and various data such as received call records and an address book. Here, the memory 19 is configured of a flash memory which is a non-volatile semiconductor memory or a SRAM (Static Random Access Memory) which is a volatile semiconductor memory, for example.

(1.2.2) Configuration of Received Call Records

Next, information stored in the memory 19 will be described. The memory 19 stores information shown in FIG. 3 as received call records.

As shown in FIG. 3, an originating mobile station, an initially designated mobile station list, a group ID, and an initial application are associated with one another in the received call records.

Here, a column for the originating mobile station represents information for identifying the mobile station 10 requesting to start the group call.

The initially designated mobile station list includes information for identifying the originating mobile station and information for identifying designated mobile stations designated by the originating mobile station. Here, in FIG. 3, the information in a column for the initially designated mobile station list includes names of the respective mobile stations 10. Instead, the information may include mobile station identification information (for example, telephone number) for identifying each of the mobile station 10.

The group ID represents information for identifying the group call to be started.

The initial application represents information for identifying an application used at a point of starting the group call (an initial application). Here, in FIG. 3, the information in a column for the initial application includes names of the respective applications. Instead, the information may include IDs for identifying the respective applications.

(1.2.3) Block Configuration of CPU

Figure 4:
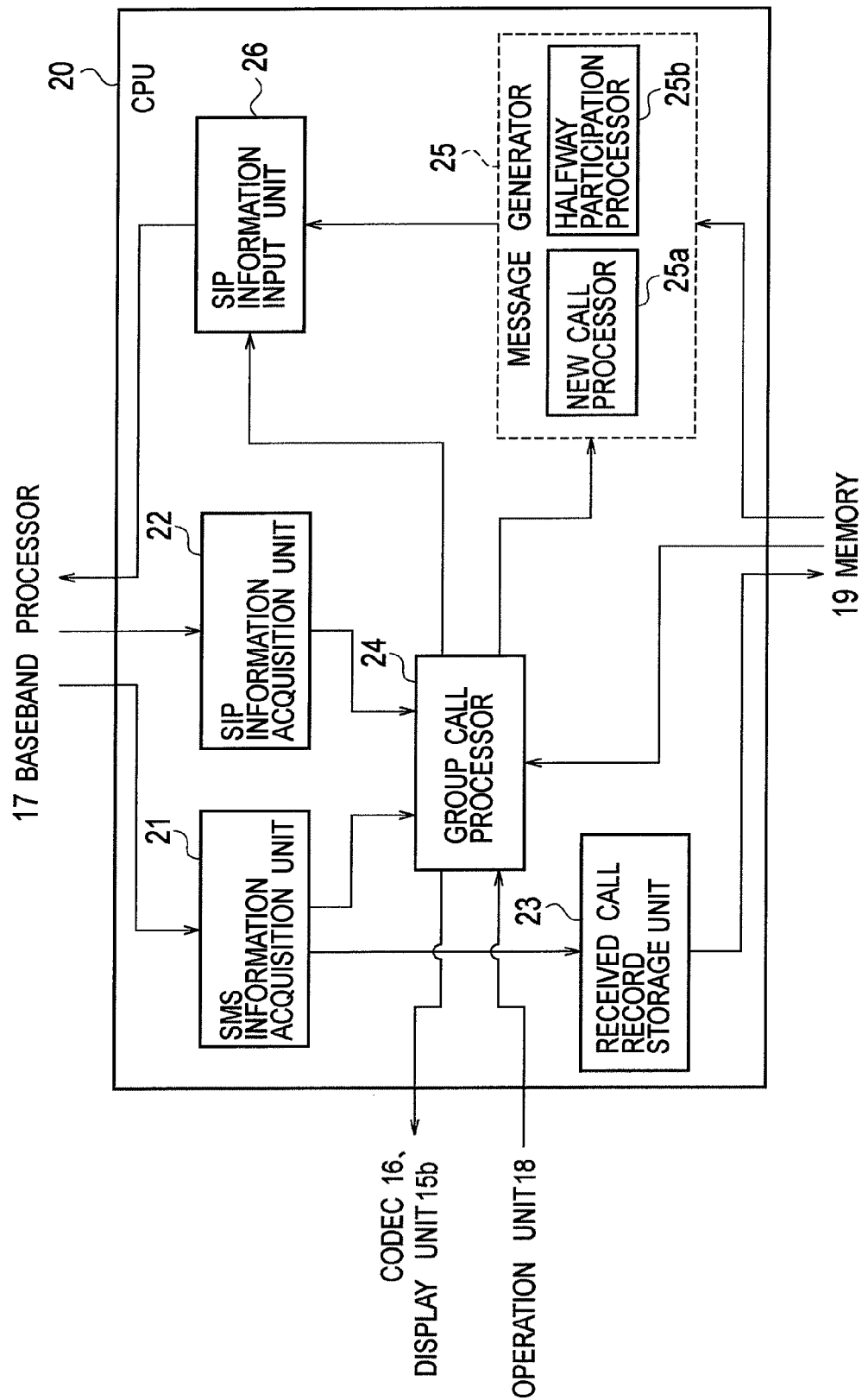
FIG. 4 is a block diagram showing a functional block configuration of a CPU of the mobile station according to the embodiment of the present invention.

Next, a block configuration of the CPU (the controller) 20 will be described. FIG. 4 is a block diagram showing the configuration of the CPU 20.

As shown in FIG. 4, the CPU 20 includes a SMS information acquisition unit 21, a SIP information acquisition unit 22, a received call record storage unit 23, a group call processor 24, a message generator 25, and SIP information input unit 26.

The CPU 20 controls the operations of the mobile station 10 (the video input-output unit 15, the codec 16, the baseband processor 17, and the like) in accordance with a program stored in the memory 19.

The SMS information acquisition unit 21 acquires the SMS information received from the SMS server 100 through the circuit switching network 300 from the baseband processor 17, and inputs the acquired SMS information into the group call processor 24. Here, the SMS information is an address registration request (hereinafter referred to as SMS (registration request)) for requesting address registration to the SIP server 200 connected to the packet switching network 400, for example.

Specifically, the SMS (registration request) includes mobile station identifying information for identifying each of the mobile stations 10 (the mobile stations 10a to 10d in this embodiment) that are included in the initially designated mobile station list.

Moreover, the SMS (registration request) includes the group ID for identifying the group call to be started. Here, the group ID is generated by the SIP server 200 as will be described later.

The SIP information acquisition unit 22 acquires the SIP information received from the SIP server 200 through the packet switching network 400 from the baseband processor 17, and inputs the acquired SIP information into the group call processor 24.

Here, the SIP information includes INVITE (new call), INVITE (halfway participation), INFO (participant notification), INFO (participant update notification), INFO (application change request), and various messages (100 Trying, 180 Ringing, 200 OK, ACK, BYE, and the like).

Here, the INVITE (new call) is a message requesting participation in the group call to the other mobile station 10.

The INVITE (halfway participation) is a message requesting participation halfway in the group call.

The INFO (participant notification) is a message indicating a new mobile station 10 participating in the group call.

The INFO (participant update notification) is a message indicating that the mobile station 10 participating in the group call is updated.

The INFO (application change request) is a message requesting for a change of the application used in the group call.

The received call record storage unit 23 stores the received call record in the memory 19 in response to the SMS (registration request) acquired from the SMS information acquisition unit 21. Specifically, the received call record storage unit 23 stores the mobile station identification information included in the SMS (registration request) in the memory 19 as the received call record. Moreover, the received call record storage unit 23 stores the group ID included in the SMS (registration request) in the memory 19 as the received call record.

The group call processor 24 performs processing related to the group call in accordance with the SIP. For example, the group call processor 24 performs processing to start a new group call, processing to answer a call from another mobile station 10, processing to participate halfway in the group call, processing to terminate the group call, and the like, in response to the input signals acquired from the operation unit 18.

Moreover, the group call processor 24 performs processing to register an address in the SIP server 200 (registration processing) in response to the SMS (registration request) acquired from the SMS information acquisition unit 21. The group call processor 24 generates SIP information in response to the SIP information acquired from the SIP information acquisition unit 22, and inputs the generated SIP information into the SIP information input unit 26.

The group call processor 24 inputs a generation request for requesting generation of the SIP information into the message generator 25 when starting a new group call or when participating halfway in the group call.

The message generator 25 includes a new call processor 25a and a halfway participation processor 25b, and inputs the SIP information generated by the new call processor 25a and the halfway participation processor 25b to the SIP information input unit 26.

The new call processor 25a generates the INVITE (new call) in response to the generation request acquired from the group call processor 24 when starting a new group call.

Specifically, the new call processor 25a reads the mobile station identification information for identifying each of the designated mobile stations 10 out of the address book stored in the memory 19, and generates the INVITE (new call) including the mobile station identification information thus read. Here, the mobile station identification information may be inputted by the operation unit 18.

Meanwhile, the halfway participation processor 25b generates the INVITE (halfway participation) in response to the generation request acquired from the group call processor 24 when participating halfway in the group call.

Specifically, the halfway participation processor 25b generates the INVITE (halfway participation) including the group ID designated by a user out of the received call records stored in the memory 19. The halfway participation processor 25b makes reference to initial application identification information included in the received call records, and generates the INVITE (halfway participation) for each application (the initial application) at a time point of designation as a destination of the group call.

The SIP information input unit 26 inputs the SIP information acquired from the group call processor 24 and the message generator 25 to the baseband processor 17.

That is, in this embodiment, the message generator 25 and the SIP information input unit 26 constitute a part of the transmitter configured to transmit a halfway participation request (the INVITE (halfway participation)).

Meanwhile, in this embodiment, the CPU (the controller) 20 constitutes a controller configured to perform control so as to retransmit the halfway participation request (the INVITE (halfway participation)) to a management server (the SIP server 200) by using an active application on the basis of a notification (answer failure (BYE)) received by the receiver (the RF/IF converter 12 and the baseband processor 17).

(1.3) Configuration of SIP Server

Next, a configuration of the SIP server 200 will be described. Specifically, (1.3.1) a configuration of group call management information and (1.3.2) a functional block configuration of the SIP server will be described.

(1.3.1) Configuration of Group Call Management Information

The SIP server 200 stores group call management information shown in FIG. 5 in order to manage the mobile stations 10 that perform the group call. FIG. 5(a) and FIG. 5(b) are views showing the group call management information.

As shown in FIG. 5(a) and FIG. 5(b), in the group call management information, the group ID, the originating mobile station, the initially designated mobile station list, currently participating members, the active application, and a call status are associated with one another.

As described previously, the group ID is the ID for identifying the group call.

As described previously, the originating mobile station is the mobile station 10 which requests to start the group call.

As described previously, the initially designated mobile station list includes the identification information on the originating mobile station and the designated mobile stations that are designated by the originating mobile station.

The currently participating members are the mobile stations 10 currently participating in the group call. In this embodiment, as described previously, the mobile station 10 participating in the group call can invite another mobile station 10 not included in the initially designated mobile station list 10 to the group call. Therefore, the currently participating members may include mobile stations 10 which are not included in the initially designated mobile station list.

Specifically, as shown in FIG. 5(a), currently participating members of a group call having a group ID of No. 001 include the mobile stations 10a to 10c. Meanwhile, as shown in FIG. 5(b), the currently participating members of the group call having the group ID of No. 001 may include the mobile stations 10a, 10e, and 10f due to change in the mobile stations 10 participating in the group call.

Meanwhile, as shown in FIG. 5(b), the initially designated mobile station list for the group call having the group ID of No. 001 is the same as the initially designated mobile station list for a group call having the group ID of No. 003. Nevertheless, if the mobile stations 10 participating in the group call (No. 001) are changed from the initially designated mobile station list, or if the new group call (No. 003) having the same initially designated mobile station list as No. 001 is started during the group call performed by the currently participating members, then there may be a case where multiple group calls having the same initially designated mobile station list are continued at the same time.

In this embodiment, even when the multiple groups calls having the same initially designated mobile station list are continued at the same time, each of the group calls is uniquely established and managed by use of the group ID.

The active application shows application identification information for identifying the application which is executing the group call.

(1.3.2) Block Configuration of SIP Server

Figure 6:
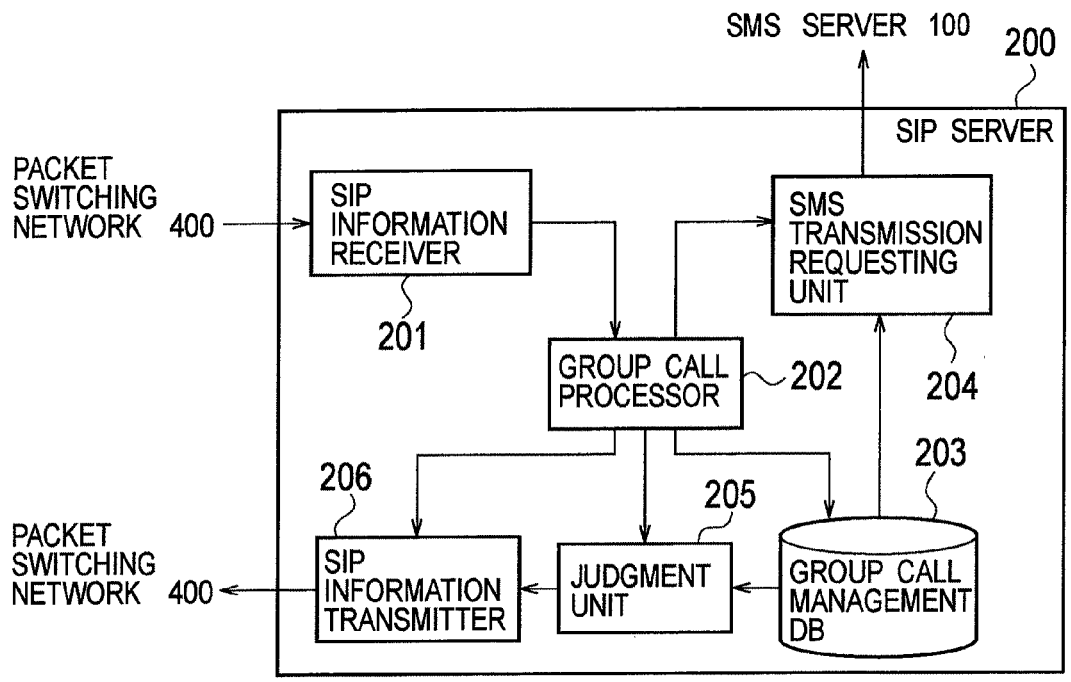
FIG. 6 is a block diagram showing a configuration of the SIP server according to the embodiment of the present invention.

FIG. 6 is a block diagram showing a configuration of the SIP server 200.

As shown in FIG. 6, the SIP server 200 includes a SIP information receiver 201, a group call processor 202, a group call management DB 203, an SMS transmission requesting unit 204, a judgment unit 205, and a SIP information transmitter 206.

The SIP information receiver 201 receives the SIP information from the mobile station 10 through the packet switching network 400.

The group call processor 202 performs processing related to the group call in accordance with the SIP. For example, when the SIP information receiver 201 receives the INVITE (new call), the group call processor 202 stores the mobile station identification information for identifying each of the mobile stations 10 included in the initially designated mobile station list in the group call management DB 203.

Subsequently, the group call processor 202 generates the group ID for identifying the group call, and stores the generated group ID in the group call management DB 203. Moreover, the group call processor 202 stores the application identification information for identifying the application for executing the group call in the group call management DB 203, the application identification information used for the transmission of the INVITE (new call) by the mobile station 10.

When the SIP information receiver 201 receives the INVITE (new call), the group call processor 202 generates a SMS transmission request for requesting transmission of the SMS information for requesting address registration to the SIP server 200, and inputs the generated SMS transmission request into the SMS transmission requesting unit 204.

Here, the SMS transmission request includes the group ID for identifying the group call in addition to the mobile station identification information for identifying each of the mobile stations 10 included in the initially designated mobile station list.

When the SIP information receiver 201 receives the SIP information (200 OK) indicating that another mobile station 10 has participated halfway in the group call, the group call processor 202 updates the information stored in the group call management DB 203. Subsequently, the group call processor 202 generates the INFO (participant notification), and inputs the generated SIP information into the SIP information transmitter 206.

When the SIP information receiver 201 receives the SIP information (200 OK) indicating that another mobile station 10 has participated halfway in the group call, the group call processor 202 updates the information stored in the group call management DB 203. Subsequently, the group call processor 202 generates the INFO (participant update notification), and inputs the generated SIP information into the SIP information transmitter 206.

When the SIP information receiver 201 receives the SIP information (BYE) indicating that a certain mobile station 10 leaves the group call, the group call processor 202 updates the information stored in the group call management DB 203. Subsequently, the group call processor 202 generates the INFO (participant update notification), and inputs the generated SIP information into the SIP information transmitter 206.

When the SIP information receiver 201 receives the INVITE (halfway participation), the group call processor 202 inputs the group ID included in the INVITE (halfway participation) into the judgment unit 205.

When the SIP information receiver 201 receives the SIP information (200 OK) indicating that the application having executed the group call is terminated in order to change the application for executing the group call, the group call processor 202 updates the application identification information stored in the group call management DB 203 to the information corresponding to the changed application.

The SMS transmission requesting unit 204 transmits the SMS transmission request acquired from the group call processor 202 to the SMS server 100.

The judgment unit 205 judges whether the participation of the mobile station 10 transmitting the INVITE (halfway participation) in halfway is possible. Specifically, the judgment unit 205 judges whether the group call specified by the group ID acquired from the group call processor 202 is continued.

Here, the judgment unit 205 judges that the participation of the mobile station 10 in halfway is possible when the group call specified by the group ID is continued, and judges that the participation of the mobile station 10 in halfway is not possible when the group call specified by the group ID is terminated.

Meanwhile, the judgment unit 205 judges whether the application for executing the group call matches the application used for transmission of the INVITE (halfway participation). Specifically, the judgment unit 205 judges whether the application identification information indicating the application for executing the group call, the application identification information stored in the group call management DB 203, matches the application identification information identifying the application used for the transmission of the INVITE (halfway participation) by the mobile station.

Here, if systems (such as servers) for executing the applications are different for each of applications, a judgment is made as to whether the group call which being requested of the halfway participation is performed in the system executing the application used for transmission of the halfway participation request.

Meanwhile, if multiple applications are executed by using the same system, a judgment is made as to which applications are used in the same system.

The SIP information transmitter 206 transmits the SIP information (the INVITE (new call), the INVITE (halfway participation), 100 Trying, 180 Ringing, 200 OK, BYE, ACK, INFO, and the like) acquired from the group call processor 202 to the mobile station 10 through the packet switching network 400.

(1.4) Configuration of SMS Server

Figure 7:
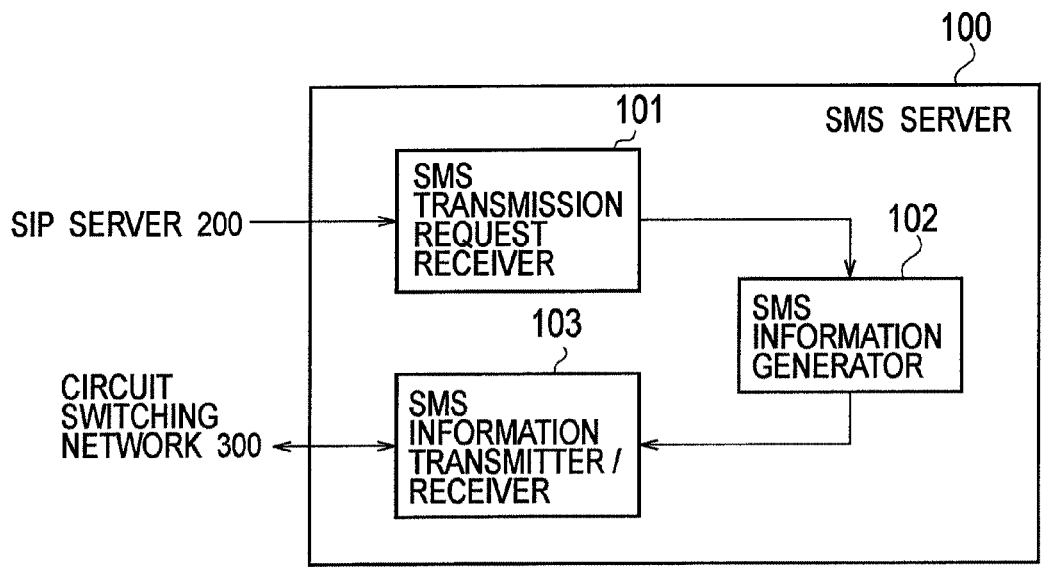
FIG. 7 is a block diagram showing a configuration of a SMS server according to the embodiment of the present invention.

Next, a configuration of the SMS server 100 will be described. FIG. 7 is a block diagram showing the configuration of the SMS server 100.

As shown in FIG. 7, the SMS server 100 includes a SMS transmission request receiver 101, a SMS information generator 102, and a SMS information transmitter/receiver 103.

The SMS transmission request receiver 101 receives the SMS transmission request for requesting transmission of the SMS information from the SIP server 200, the SMS information being information for requesting address registration to the SIP server 200. Here, as described previously, the SMS transmission request includes the group ID for identifying the group call to be started by the group, in addition to the mobile station identification information for identifying each of the mobile stations 10 included in the initially designated mobile station list.

The SMS information generator 102 generates the SMS information to be transmitted to each of the mobile stations 10 in response to the SMS transmission request received by the SMS transmission request receiver 101. Specifically, the SMS information generator 102 generates the SMS (registration request) for requesting address registration to the SIP server 200.

The SMS (registration request) includes the group ID for identifying the group call to be started by the group and the initial application identification information, in addition to the mobile station identification information for identifying each of the mobile stations 10 included in the initially designated mobile station list.

The SMS information transmitter/receiver 103 transmits the SMS information generated by the SMS information generator 102 to the mobile station 10 through the circuit switching network 300. Specifically, the SMS information transmitter/receiver 103 transmits the SMS (registration request) generated by the SMS information generator 102 to the designated mobile stations included in the initially designated mobile station list through the circuit switching network 300.

(2) Operations of Mobile Communication System

Next, operations of the mobile communication system 1 will be described by using FIG. 8 to •BR>}11. Specifically, (2.1) a group call starting operation, (2.2) an application changing operation, and (2.3) a halfway participation operation will be described.

The group call starting operation is an operation executed until the group call is started in the group including the originating mobile station and the mobile stations 10 which answer the call from the originating mobile station, the mobile stations 10 being among the designated mobile stations designated by the originating mobile station.

The application changing operation is an operation in which the application for executing the group call is changed from an application 1 (for example, IP-TV (Internet Protocol-TV (television) phone or Internet Protocol-video phone)) to an application 2 (for example, PTT (Push To Talk)).

The halfway participation operation is an operation in which the mobile station 10 included in the initially designated mobile station list participates in the group call in halfway.

(2.1) Group Call Starting Operation

Figure 8:
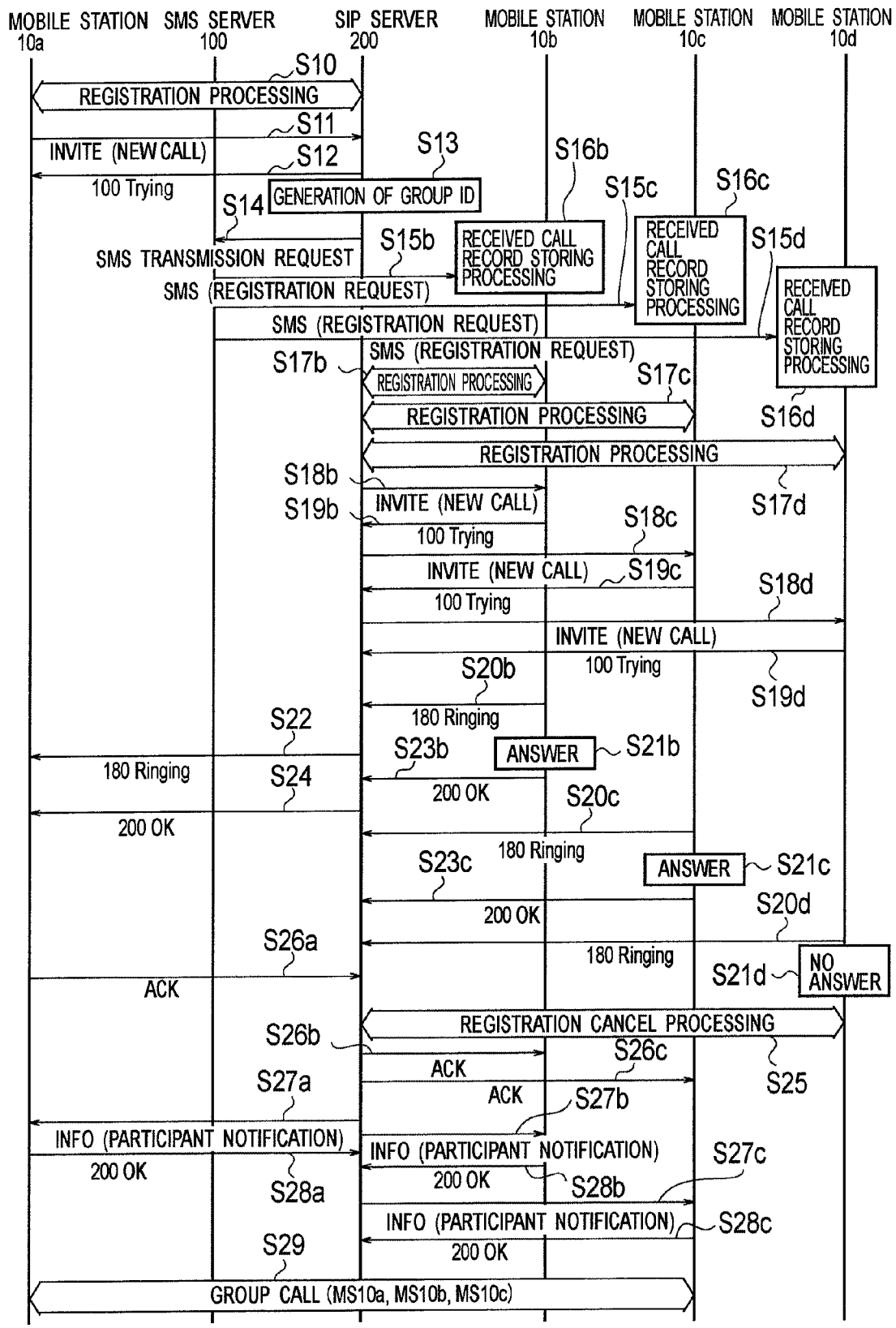
FIG. 8 is a sequence diagram showing a group call starting operation according to the embodiment of the present invention.

FIG. 8 is a sequence diagram showing the group call starting operation.

In step (abbreviated as "S" in the drawing) 10, the mobile station 10a logs into the SIP server 200. Specifically, the mobile station 10a performs processing to register the address of the mobile station 10a in the SIP server 200 (address registration).

In step 11, the mobile station 10a transmits the INVITE (new call) to the SIP server 200 in order to start a new group call. Here, the INVITE (new call) includes the mobile station identification information for identifying each of the mobile stations 10b to 10d, in addition to the mobile station identification information (for example, a telephone number) for identifying the mobile station 10a.

In step 12, the SIP server 200 transmits a temporary answer (100 Trying) indicating a start of call processing of the mobile stations 10b to 10d in response to the INVITE (new call), to the mobile station 10a.

In step 13, the SIP server 200 generates the group ID for identifying the group call in which mobile stations 10a to 10d are defined as the designated mobile stations.

In step 14, the SIP server 200 transmits the SMS transmission request for requesting transmission of the SMS (registration request) for requesting address registration to the SIP server 200 to the SMS server 100. Here, the SMS transmission request includes the group ID generated in step 13, in addition to the mobile station identification information for identifying each of the mobile stations 10a to 10d.

In step 15b to step 15d, the SMS server 100 transmits the SMS (registration request) for requesting address registration to the SIP server 200 to the mobile stations 10b to 10d through the circuit switching network 300. Here, the SMS (registration request) includes the mobile station identification information for identifying each of the mobile stations 10a to 10d and the group ID generated in step 13.

In step 16b to step 16d, the mobile stations 10b to 10d each store the mobile station identification information, the group ID, and the initial application identification information which are included in the SMS (registration request) as the received call records.

In step 17b to step 17d, the mobile stations 10b to 10d log into the SIP server 200 connected to the packet switching network 400. Specifically, the mobile stations 10b to 10d perform registration processing to register the addresses of respective the mobile stations 10b to 10d in the SIP server 200.

In step 18b to step 18d, the SIP server 200 transmits the INVITE (new call) to the mobile stations 10b to 10d through the packet switching network 400 in order to call the mobile stations 10b to 10d in response to the INVITE (new call) received from the mobile station 10a.

In step 19b to step 19d, the mobile stations 10b to 10d each transmit a temporary answer (100 Trying) indicating arrival of the INVITE (new call) to the SIP server 200.

In step 20b to step 20d, the mobile stations 10b to 10d each transmit a temporary answer (180 Ringing) indicating that the reception processing is in progress to the SIP server 200 in response to the INVITE (new call).

In step 21b and step 21c, the mobile stations 10b and 10c answer the INVITE (new call). Specifically, users of the mobile stations 10b and 10c notice the call from the mobile station 10a, and perform answer processing such as pressing an answer key. On the other hand, in step 21d, the mobile station 10d does not answer the INVITE (new call). Specifically, a user of the mobile station 10d does not perform the answer processing such as pressing the answer key in response to the call from the mobile station 10a.

In step 22, the SIP server 200 transmits a temporary answer (180 ringing) indicating that the call for the mobile stations 10b to 10d is in progress to the mobile station 10a.

In step 23b and step 23c, the mobile stations 10b and 10c each transmit an answer success (200 OK) indicating that the mobile station 10b and 10c have answered the INVITE (new call) to the SIP server 200.

In step 24, the SIP server 200 transmits an answer success (200 OK) indicating that at least any one of the mobile stations 10b to 10d has answered the INVITE (new call) to the mobile station 10a.

In step 25, the mobile station 10d performs registration cancel processing to cancel the address registration to the SIP server 200.

In step 26a, the mobile station 10a transmits the ACK for confirming that it is possible to start the new group call to the SIP server 200. At the same time, in step 26b and step 26c, the SIP server 200 transmits the ACK for confirming that it is possible to start the new group call to the mobile stations 10b and 10c.

In step 27a to step 27c, the SIP server 200 transmits the INFO (participant notification) including the mobile station identification information (for example, telephone numbers or SIP addresses) for identifying each of the mobile stations 10 participating in a new group call to the mobile stations 10a to 10c. In step 28a to step 28c, the mobile stations 10a to 10c each transmit the answer success (200 OK) indicating receipt of the INFO (participant notification) to the SIP server 200.

In step 29, the mobile stations 10a to 10c start the group call (the mobile station 10a, the mobile station 10b, and the mobile station 10c) having the mobile stations 10a to 10c as the participating members.

(2.2) Application Changing Operation

Figure 9:
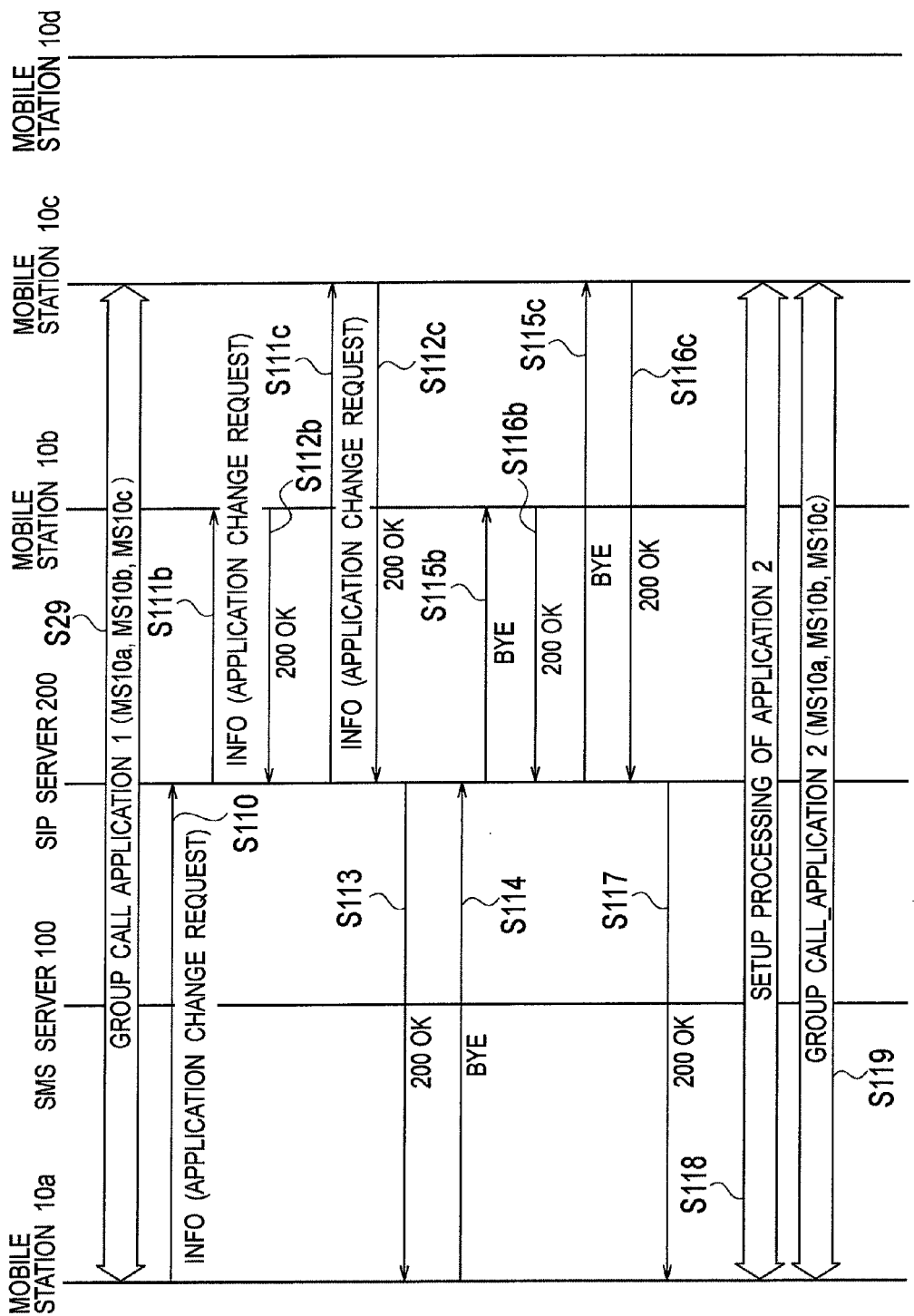
FIG. 9 is a sequence diagram showing an application changing operation according to the embodiment of the present invention.

FIG. 9 is a sequence diagram showing the application changing operation. Note that FIG. 9 shows processing subsequent to step 29 shown in FIG. 8.

In step 29, the group call having the mobile stations 10a to 10c as the participating members is continued. The application 1 is used in the group call.

In step 110, the mobile station 10a transmits the INFO (application change request) for requesting to change the application used in the group call from the application 1 to the application 2 to the SIP server 200.

A conceivable case of changing the application may be as follows. For instance, when the group call is performed in accordance with the IP-TV, reception strength of the video data falls below a predetermined threshold due to deterioration in the radio wave condition. In such a case, the application is changed to the PTT using the voice data involving a smaller amount of data than the video data.

Another conceivable case of changing the application may be as follows. For instance, when the group call is performed in accordance with the PTT, reception strength of the voice data exceeds a predetermined threshold due to improvement in the radio wave condition. In such a case, the application is changed to the IP-TV using the video data involving a larger mount of data than the voice data.

Moreover, the application used in the group call may be changed to meet the needs of users.

In step 111b and step 111c, the SIP server 200 transmits the INFO (application change request) received from the mobile station 10a to the mobile stations 10b and 10c.

In step 112b and step 112c, the mobile stations 10b and 10c each transmit the answer success (200 OK) indicating receipt of the INFO (application change request) to the SIP server 200.

In step 113, the SIP server 200 transmits the answer success (200 OK) indicating that the mobile stations 10b and 10c has received the INFO (application change request) to the mobile station 10a.

In step 114, the mobile station 10a transmits a termination request (BYE) for requesting termination of the application 1 to the SIP server 200.

In step 115b and step 115c, the SIP server 200 transmits the termination request (BYE) for requesting termination of the application 1 to the mobile stations 10b and 10c.

In step 116b and step 116c, the mobile stations 10b and 10c transmit the answer success (200 OK) indicating that the termination request (BYE) has been received to the SIP server 200.

In step 117, the SIP server 200 transmits the answer success (200 OK) indicating that the mobile stations 10b and 10c has terminated the application 1 to the mobile station 10a.

In step 118, the mobile stations 10a to 10c perform setup processing of the application 2.

In step 119, the mobile stations 10a to 10c start the group call (the mobile station 10a, the mobile station 10b, and the mobile station 10c) by using the application 2. The participating members of the group call include the mobile stations 10a to 10c as similar to step 29.

(2.3) Halfway Participation Operation

Next, the halfway participation operation will be described. Specifically, (2.3.1) a first pattern of the halfway participation operation and (2.3.2) a second pattern of the halfway participation operation will be described.

The first pattern of the halfway participation operation is an operation performed when the application which is being executed in the group call (the active application) matches the application (the initial application) used by the mobile station 10 requesting the halfway participation.

The second pattern of the halfway participation operation is an operation performed when the application which is being executed in the group call does not match the application used by the mobile station 10 requesting the halfway participation.

(2.3.1) First Pattern of Halfway Participation Operation

Figure 10:
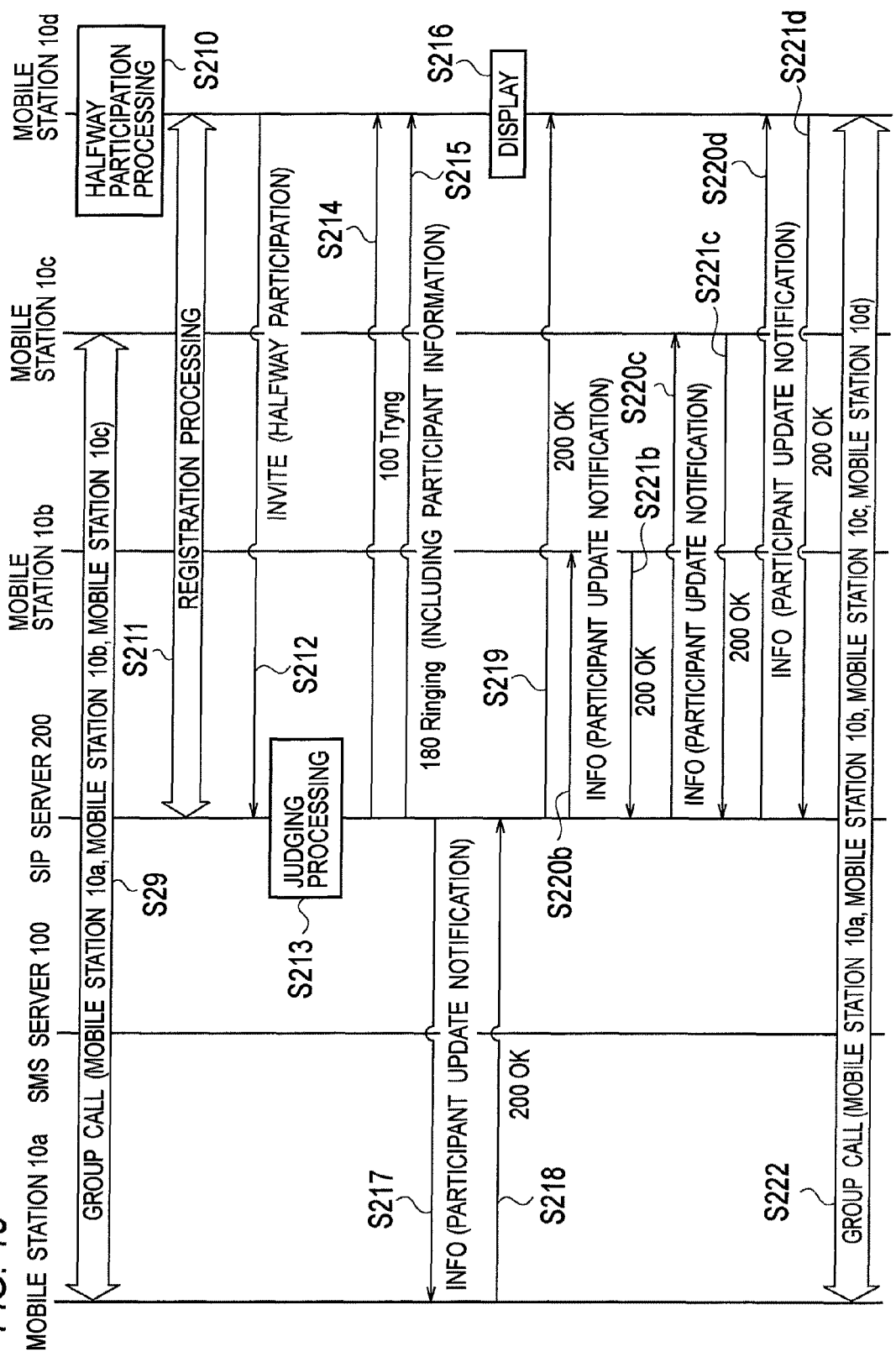
FIG. 10 is a sequence diagram showing a first pattern of a halfway participation operation according to the embodiment of the present invention.

FIG. 10 is a sequence diagram showing the first pattern of the halfway participation operation. Note that FIG. 10 shows processing that is subsequent to step 29 shown in FIG. 8.

In step 29, the group call having the mobile stations 10a to 10c as the participating members is continued.

In step 210, the mobile station 10d performs halfway participation processing in order to participate in the group call in halfway. Specifically, the user of the mobile station 10d selects the desired group call out of the received call records stored in the memory 19 and performs processing to press a call key or the like.

In step 211, the mobile station 10d logs into the SIP server 200 connected to the packet switching network 400. Specifically, the mobile station 10d performs processing for registering the address of the mobile station 10d in the SIP server 200 (registration processing).

In step 212, the mobile station 10d transmits the INVITE (halfway participation) for requesting participation in the desired group call selected in step 210 to the SIP server 200 through the packet switching network 400. Here, the INVITE (halfway participation) includes the group ID that corresponds to the desired group call. The transmission of the INVITE (halfway participation) is executed by use of the initial application indicated by the initial application identification information stored in the memory 19 as the received call records.

In step 213, the SIP server 200 judges whether the halfway participation in the group call corresponding to the group ID included in the INVITE (halfway participation) is possible, and whether the application used for the transmission of the INVITE (halfway participation) matches the application for executing the group call.

Specifically, the SIP server 200 judges that the halfway participation of the mobile station 10d is possible when the group call corresponding to the group ID is continued. On the other hand, the SIP server 200 judges that the halfway participation of the mobile station 10d is not possible when the group call corresponding to the group ID is terminated.

In addition, the SIP server 200 judges whether the identification information on the application used for the transmission of the INVITE (halfway participation) matches the identification information on the application for executing the group call. This judgment is performed by causing the mobile station 10d to incorporate the identification information on the application used for the transmission of the INVITE (halfway participation) in the INVITE (halfway participation), and then allowing the SIP server 200 to compare the identification information included in the INVITE (halfway participation) with the identification information on the application for executing the group call.

Here, in FIG. 10, the group call having the mobile stations 10a to 10c as participating members is continued. Accordingly, a judgment is made that the halfway participation of the mobile station 10d is possible. Moreover, a judgment is made that the application for executing the group call matches the application used for the transmission of the INVITE (halfway participation).

In step 214, the SIP server 200 transmits a temporary answer (100 Trying) indicating that the halfway participation processing for the mobile station 10d has been started in response to the INVITE (halfway participation) to the mobile station 10d.

In step 215, the SIP server 200 transmits a temporary answer (180 Ringing) indicating that calling of the mobile station 10a is in progress to the mobile station 10d. Here, the temporary answer (180 Ringing) includes the mobile station identification information (for example, the telephone numbers or the SIP addresses) for identifying each of the mobile stations 10 participating in the group call.

In step 216, the mobile station 10d displays the mobile station identification information for identifying each of the mobile stations 10 participating in the group call. Specifically, the mobile station 10d displays information such as "The participants in the group call right now are the mobile station 10a, the mobile station 10b, and the mobile station 10c."

In step 217, the SIP server 200 transmits the INFO (participant update notification) to the mobile station 10a. Here, the INFO (participant update notification) includes information indicating that the mobile station 10d (the mobile station identification information for identifying the mobile station 10d) has participated halfway in the group call.

Here, the SIP server 200 may be configured to judge whether it is appropriate to approve the halfway participation of the mobile station 10d. In this case, the SIP server 200 judges whether it is appropriate to approve the halfway participation of the mobile station 10d on the basis of the designated mobile station list in the group call management information. Specifically, the SIP server 200 disapproves the halfway participation of the mobile station 10d if the mobile station 10d is not included in the designated mobile station list in the group call management information.

In step 218, the mobile station 10a transmits the answer success (200 OK) indicating receipt of the INFO (participant update notification) to the SIP server 200.

Here, the mobile station 10a may be configured to judge whether it is appropriate to approve the participation of the mobile station 10d halfway in the group call. Specifically, the mobile station 10a displays information such as "Approve the halfway participation of the mobile station 10d?" Then, the mobile station 10a judges whether it is appropriate to approve the halfway participation of the mobile station 10d in accordance with an operation by the user.

Alternatively, the mobile station 10a judges whether it is appropriate to approve the halfway participation of the mobile station 10d depending on whether the mobile station 10d is included in the designated mobile stations at the time of starting the group call. Specifically, the mobile station 10a disapproves the halfway participation of the mobile station 10d if the mobile station 10d is not included in the designated mobile stations at the time of starting the group call.

In step 219, the SIP server 200 transmits the answer success (200 OK) indicating the approval of the halfway participation of the mobile station 10d to the mobile station 10d.

In step 220b and step 220c, the SIP server 200 transmits the INFO (participant update notification) to the mobile stations 10b and 10c. In step 221b and step 221c, the mobile stations 10b and 10c transmit the answer success (200 OK) indicating the receipt of the INFO (participant update notification) to the SIP server 200.

In step 220d, the SIP server 200 transmits the INFO (participant notification) including the mobile station identification information for identifying each of the mobile stations 10 participating in the group call to the mobile station 10d. In step 221d, the mobile station 10d transmits the answer success (200 OK) indicating the receipt of the INFO (participant notification) to the SIP server 200.

In step 222, the mobile stations 10a to 10d start the group call having the mobile stations 10a to 10d as the participating members.

(2.3.2) Second Pattern of Halfway Participation Operation

Figure 11:
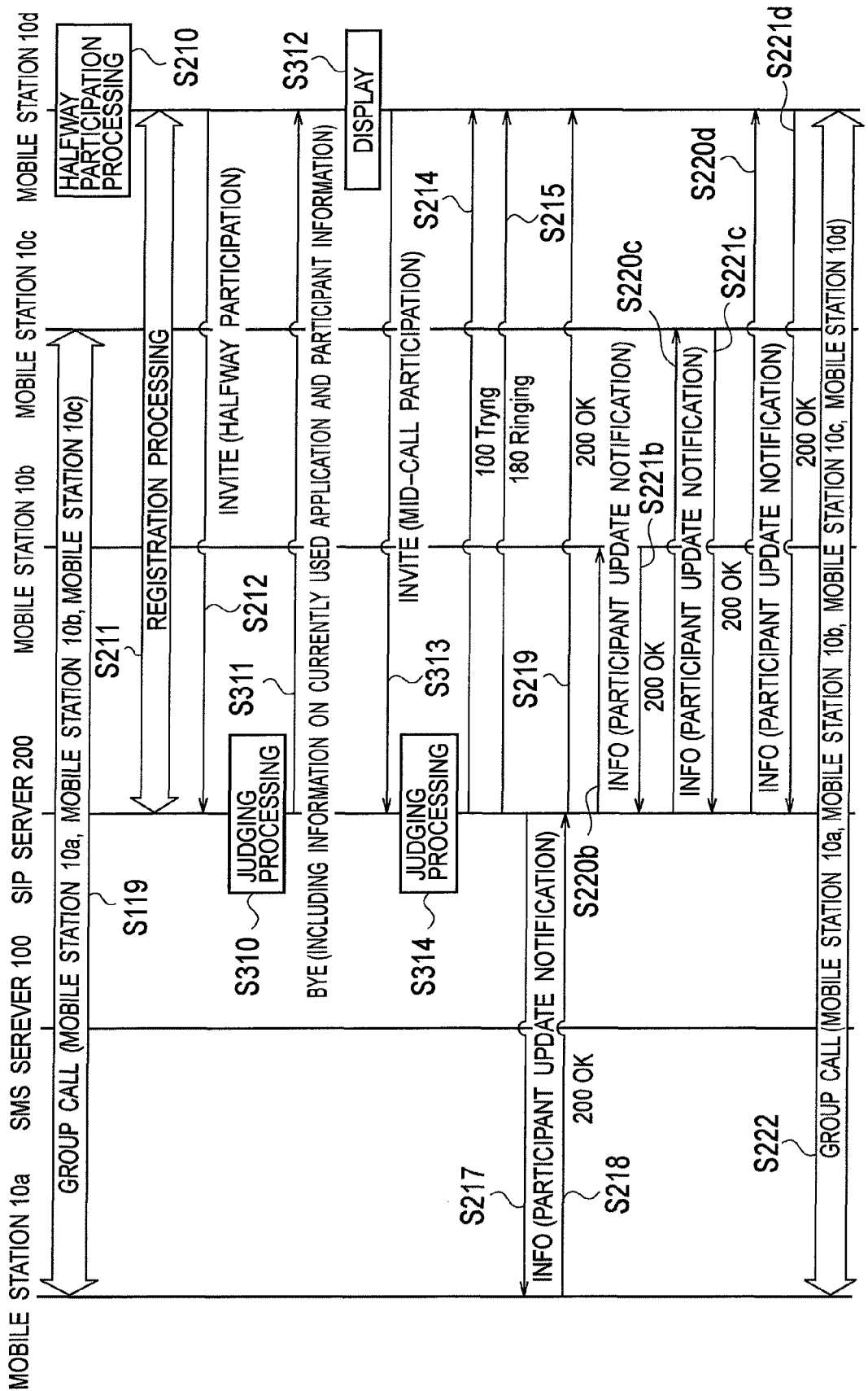
FIG. 11 is a sequence diagram showing a second pattern of the halfway participation operation according to the embodiment of the present invention.

Next, the second pattern of the halfway participation operation will be described. FIG. 11 is a sequence diagram showing the second pattern of the halfway participation operation.

Note that FIG. 11 shows processing subsequent to step 119 shown in FIG. 9, namely, processing after changing the application. In the following, procedures different from those in FIG. 10 will be described, and redundant explanation will be omitted therein.

In step 119, the group call having the mobile stations 10a to 10c as the participating members is continued.

The respective procedures from step 210 to step 212 are executed similarly to FIG. 10.

In step 310, the SIP server 200 judges whether the halfway participation in the group call corresponding to the group ID included in the INVITE (halfway participation) is possible, and whether the application used by the mobile station 10 for the transmission of the INVITE (halfway participation) matches the application for executing the group call.

In FIG. 11, the group call having the mobile stations 10a to 10c as the participating members is continued. Accordingly, the SIP server 200 judges that the halfway participation of the mobile station 10d is possible. Meanwhile, the SIP server 200 judges that the identification information on the application used by the mobile station 10 for the transmission of the INVITE (halfway participation) does not match the identification information on the application for executing the group call.

In step 311, the SIP server 200 transmits the answer failure (BYE) indicating that the application used by the mobile station 10d for transmitting the INVITE (halfway participation) does not match the application which is being executed in the group call to the mobile station 10d.

Here, the answer failure (BYE) includes application identification information which is being executed in the group call and the mobile station identification information for identifying each of the mobile stations 10 participating in the group call.

In step 312, the mobile station 10d displays information indicating that the application used by the mobile station 10d for the transmission of the INVITE (halfway participation) does not match the application which is being executed in the group call.

Specifically, the mobile 10d displays information such as "The application currently used in the group call has been changed. Connection will be attempted by using the application after the change." Note that the display of this information is not essential.

Moreover, the mobile station 10d displays the mobile station identification information (for example, the telephone numbers and the SIP addresses) for identifying each of the mobile stations 10 participating in the group call. Specifically, the mobile station 10d displays information such as "The participants in the group call right now are the mobile station 10a, the mobile station 10b, and the mobile station 10c."

In step 313, the mobile station 10*d* transmits the INVITE (halfway participation) for requesting participation in the desired group call selected in step 210 to the SIP server 200 through the packet switching network 400 by use of the application which is being executed in the group call. Here, the INVITE (halfway participation) includes the group ID corresponding to the desired group call.

In step 314, as similar to step 310, the SIP server 200 judges whether the halfway participation in the group call corresponding to the group ID included in the INVITE (halfway participation) is possible, and whether the application used by the mobile station 10 for the transmission of the INVITE (halfway participation) matches the application for executing the group call.

In FIG. 11, a judgment is made that the halfway participation of the mobile station 10*d* is possible. Moreover, a judgment is made that the identification information on the application used by the mobile station 10 for the transmission of the INVITE (halfway participation) matches the identification information on the application for executing the group call.

In step 214, the SIP server 200 transmits the temporary answer (100 Trying) indicating that the halfway participation processing for the mobile station 10*d* has been started in response to the INVITE (halfway participation) to the mobile station 10*d*.

In step 215, the SIP server 200 transmits the temporary answer (180 Ringing) indicating that calling of the mobile station 10*a* is in progress to the mobile station 10*d*.

The respective procedures from step 217 to step 222 are executed similarly to FIG. 10.

(3) Advantageous Effect

As described above, according to this embodiment, the SIP server 200 includes the SIP information receiver 201, the group call processor 202, the judgment unit 205, and the SIP information transmitter 206, the SIP server 200 configured to manage the group call in which the call within the group consisting of the mobile stations 10 is possible.

The SIP information transmitter 201 receives the INVITE (halfway participation) for requesting participation in the group call from the mobile station 10. The group call processor 202 determines the application executed by the mobile station 10 transmitting the INVITE (halfway participation) on the basis of the INVITE (halfway participation) received by the SIP information receiver 201. The judgment unit 205 judges whether the application which is being executed in the group call matches the application executed by the mobile station 10 transmitting the INVITE (halfway participation).

If the application which is being executed in the group call is different from the application executed by the mobile station 10 transmitting the INVITE (halfway participation), the SIP information transmitter 206 transmits the application which is being executed in the group call to the mobile station 10 transmitting the INVITE (halfway participation) by using the answer failure (BYE).

The halfway participation processor 25*b* being the controller (CPU) of the mobile station 10 performs control so as to retransmit the INVITE (halfway participation) to the management server by using the active application on the basis of the identification information on the active application, the identification information being included in the answer failure (BYE).

According to the above description, even when the mobile station 10 participates halfway in the group call, the mobile station 10 is able to participate in the group call by using the application which is being executed in the group call. Specifically, even when the application for executing the group call is changed after starting the group call, the mobile station 10 is able to participate halfway in the group call by using the application after the change.

Moreover, according to this embodiment, the mobile station 10 includes the display unit 15*b* and the operation unit 18. The display unit 15*b* displays the information indicating the application which is being executed in the group call on the basis of the answer failure (BYE) received from the SIP server 200. The operation unit 18 receives an operation from the user indicating whether to transmit the INVITE (halfway participation) to the SIP server 200, after the information indicating the application is displayed on the display unit 15*b*. When the operation unit 18 receives the operation from the user to transmit the INVITE (halfway participation) to the SIP server 200, the halfway participation processor 25*b* of the mobile station 10 transmits the INVITE (halfway participation) to the SIP server 200.

Therefore, the user of the mobile station 10 to be participating halfway in the group call is able to participate halfway in the group call after confirming the application which is being executed in the group call. Moreover, if the application which is being executed in the group call is the application not intended by the user of the mobile station 10 to be participating halfway in the group call, the user is able to cancel the halfway participation.

Moreover, according to this embodiment, the mobile station 10 includes the group call processor 24 configured to set up sessions with the SIP server 200 for each the application. The group call processor 24 disconnect the session with the SIP server 200 when the answer failure (BYE) is received from the SIP server 200. When the session with the SIP server 200 is disconnected, the halfway participation processor 25*b* of the mobile station 10 transmits the INVITE (halfway participation) to the SIP server 200 by using the application which is being executed in the group call.

In other words, since the INVITE (halfway participation) is transmitted to the SIP server 200 immediately after the session with the SIP server 200 is disconnected, the time period required for re-setting of the session with the SIP server 200 is reduced.

According to this embodiment, the mobile station 10 includes the SMS information acquisition unit 21 and the received call record storage unit 23. The SMS information acquisition unit 21 acquires the SMS (registration request) for requesting to log into the SIP server 200, the SMS including the initial application identification information for identifying the initial application executed at the time of starting the group call. The received call record storage unit 23 stores the initial application identification information included in the SMS (registration request). The halfway participation processor 25*b* transmits the INVITE (halfway participation) to the SIP server 200 by using the initial application on the basis of the initial application identification information stored in the received call record storage unit 23.

Therefore, when the application is not changed from the start of the group call, the mobile station 10 can participate in halfway the group call on the basis of the initial application identification information stored in the received call record storage unit 23.

(4) Other Embodiments

Although the present invention has been described above based on a certain embodiment, it is to be understood that the descriptions and the drawings constituting part of this disclosure will not limit this invention. It is obvious to those skilled in the art that various alternative embodiments, examples, and operation techniques are possible from this disclosure.

The base station 30 and the base station 40 are described as separate base stations in FIG. 1. However, the invention is not limited to this configuration. Specifically, it is possible to provide a single base station included in both of the circuit switching network 300 and the packet switching network 400, the base station having the functions of both of the base station 30 and the base station 40.

In the above-described embodiment, the SMS server 100 and the SIP server 200 are explained as separate servers. However, the invention is not limited to this configuration. Specifically, it is possible to provide a single server connected to both of the circuit switching network 300 and the packet switching network 400, the server having the functions of both of the SMS server 100 and the SIP server 200.

In the above-described embodiment, the servers provided in the communication system consist of the SMS server 100 and the SIP server 200. However, the invention is not limited to this configuration. Specifically, in addition to the SMS server 100 and the SIP server 200, the communication system may further include a group call management server configured to manage group calls. In this case, the group call management DB 203 originally provided in the SIP server 200 may be provided in the group call management server instead.

In the above-described embodiment, the mobile station 10 is notified of the group ID by the SMS (registration request) for requesting the address registration to the SIP server 200. However, the invention is not limited to this configuration. Specifically, the mobile station 10 may be notified of the group ID by the SMS information to be transmitted through the circuit switching network 300 after the group call is started. Alternatively, the mobile station 10 may be notified of the group ID by the SIP information (for example, INVITE) to be transmitted through the packet switching network 400.

In the above-described embodiment, when the mobile station participates halfway in the desired group call, if this group call is present, and if the application which is being executed in the group call does not match the application used for transmission of the INVITE (halfway participation), the mobile station 10 to be performing the halfway participation is notified of the mobile station identification information (for example, telephone numbers or SIP addresses) for identifying each of the mobile stations 10 participating in this group call by the SIP information (BYE) indicating the answer failure. However, the invention is not limited to this configuration. Specifically, the mobile station 10 to be performing the halfway participation may be notified of the mobile station identification information by the other SIP information (for example, 180 Ringing).

As described above, it is to be understood that the present invention encompasses various embodiments and the like which are not described herein. Therefore, the present invention is limited only by the features of the invention which are defined by the appended scope claims as being appropriate from this disclosure.

INDUSTRIAL APPLICABILITY

As described above, according to the radio communication system, the management server, the radio communication terminal, and the radio communication method of the present invention, participation in a group call is possible by using an active application even when the radio communication terminal participates halfway in the group call. Hence, the invention is useful in radio communication such as mobile telecommunication.

The invention claimed is:

1. A radio communication system comprising:
   a management server configured to manage a group call in which a call within a group consisting of a plurality of radio communication terminals is possible; and
   a radio communication terminal configured to communicate with the management server, wherein
   the management server includes:
      a halfway participation request receiver configured to receive a halfway participation request for requesting halfway participation in the group call from the radio communication terminal;
      a judgment unit configured to specify an application executed by the radio communication terminal transmitting the halfway participation request on the basis of the halfway participation request received by the halfway participation request receiver, and to judge whether the specified application matches an active application that is an application which is being executed in the group call; and
      an application notifying unit configured to notify the radio communication terminal transmitting the halfway participation request of the active application when a judgment is made that the application executed by the radio communication terminal transmitting the halfway participation request is different from the active application, and
   the radio communication terminal includes:
      a transmitter configured to transmit the halfway participation request to the management server;
      a receiver configured to receive a notification of the active application from the management server; and
      a controller configured to perform control, based on the notification received by the receiver, so that the halfway participation request is retransmitted to the management server by using the active application.

2. A management server configured to manage a group call in which a call within a group consisting of a plurality of radio communication terminals is possible, the management server comprising:
   a halfway participation request receiver configured to receive a halfway participation request for requesting halfway participation in the group call from a radio communication terminal;
   a judgment unit configured to specify an application executed by the radio communication terminal transmitting the halfway participation request on the basis of the halfway participation request received by the halfway participation request receiver, and to judge whether the specified application matches an active application that is an application which is being executed in the group call; and
   an application notifying unit configured to notify the radio communication terminal transmitting the halfway participation request of the active application when the judgment unit judges that the application executed by the radio communication terminal transmitting the halfway participation request is different from the active application.

3. A radio communication terminal configured to communicate with a management server managing a group call in which a call within a group consisting of a plurality of radio communication terminals is possible, the radio communication terminal comprising:

a transmitter configured to transmit a halfway participation request for requesting halfway participation in the group call to the management server;

a receiver configured to receive a notification of an active application from the management server, the active application being an application which is being executed in the group call; and a controller configured to perform control, based on the notification received by the receiver, so that the halfway participation request is retransmitted to the management server by using the active application.

4. The radio communication terminal according to claim 3, further comprising:

an operation unit configured to receive a user input; and a display unit configured to display information indicating the active application on the basis of the notification received by the receiver, wherein the controller retransmits the halfway participation request to the management server by using the active application when an instruction to retransmit the halfway participation request to the management server is inputted on the basis of a display of the information indicating the active application on the display unit.

5. The radio communication terminal according to claim 3, further comprising a connection controller configured to set up call connection to the management server for each application, wherein the connection controller disconnects the call connection to the management server when the receiver receives the notification of the active application, and the controller retransmits the halfway participation request to the management server by using the active application when the connection controller disconnects the call connection to the management server.

6. The radio communication terminal according to claim 3, further comprising:

a registration request receiver configured to receive a registration request for requesting registration to the management server, the registration request including initial application identification information for identifying an initial application being an application executed at a start of the group call; and a storage unit configured to store the initial application identification information included in the registration request, wherein the transmitter transmits the halfway participation request to the management server by using the initial application on the basis of the initial application identification information stored in the storage unit.

7. A radio communication method using a management server configured to manage a group call in which a call within a group consisting of a plurality of radio communication terminals is possible, and using a radio communication terminal configured to communicate with the management server, the method comprising the steps of:

transmitting, at the radio communication terminal, a halfway participation request for requesting participation in the group call to the management server;

receiving, at the management server, the halfway participation request from the radio communication terminal;

specifying, at the management server, an application executed by the radio communication terminal on the basis of the halfway participation request received in the receiving step;

judging, at the management server, whether the application executed by the radio communication terminal matches an active application that is an application which is being executed in the group call;

notifying, at the management server, the radio communication terminal of the active application when judging the application executed by the radio communication terminal is different from the active application;

receiving, at the radio communication terminal, a notification of the active application from the management server; and retransmitting, at the radio communication terminal, the halfway participation request to the management server by using the active application on the basis of the notification received from the management server.

* * * * *